(12) United States Patent
De Pomian

(10) Patent No.: US 8,060,077 B2
(45) Date of Patent: Nov. 15, 2011

(54) METHOD AND APPARATUS FOR FUNCTIONAL TESTING OF A BASE STATION SYSTEM

(75) Inventor: Erik De Pomian, Sollentuna (SE)

(73) Assignee: Telefonaktiebolaget L M Ericsson (publ) (SE)

( * ) Notice: Subject to any disclaimer, the term of this patent is extended or adjusted under 35 U.S.C. 154(b) by 501 days.

(21) Appl. No.: 12/295,197

(22) PCT Filed: Mar. 30, 2006

(86) PCT No.: PCT/SE2006/050051
§ 371 (c)(1),
(2), (4) Date: Sep. 29, 2008

(87) PCT Pub. No.: WO2007/114745
PCT Pub. Date: Oct. 11, 2007

(65) Prior Publication Data
US 2009/0264119 A1 Oct. 22, 2009

(51) Int. Cl.
*H04W 24/00* (2009.01)
*H04B 4/00* (2006.01)

(52) U.S. Cl. ............... 455/423; 455/115.1; 455/424

(58) Field of Classification Search ........... 455/115.3, 455/423, 424; 370/332, 333, 334
See application file for complete search history.

(56) References Cited

U.S. PATENT DOCUMENTS

| | | | |
|---|---|---|---|
| 5,590,172 A * | 12/1996 | Lodwig et al. | 455/436 |
| 5,752,165 A * | 5/1998 | Hokkanen | 455/67.11 |
| 6,091,970 A * | 7/2000 | Dean | 455/562.1 |
| 6,104,936 A | 8/2000 | Kronestedt | |
| 6,256,490 B1 * | 7/2001 | Yost et al. | 455/405 |
| 6,587,686 B1 * | 7/2003 | Cuffaro et al. | 455/423 |
| 6,785,541 B2 * | 8/2004 | Martin | 455/423 |
| 7,113,791 B2 * | 9/2006 | Lepschy et al. | 455/423 |
| 7,155,216 B2 * | 12/2006 | Kiukkonen et al. | 455/423 |
| 2003/0212941 A1 | 11/2003 | Gillies et al. | |

FOREIGN PATENT DOCUMENTS

| | | |
|---|---|---|
| EP | 1052824 A2 | 11/2000 |
| WO | WO 2005/041424 A2 | 5/2005 |

OTHER PUBLICATIONS

International Search Report and Written Opinion dated Dec. 27, 2006 (7 pages).

* cited by examiner

*Primary Examiner* — Nick Corsaro
*Assistant Examiner* — Michael S Bush
(74) *Attorney, Agent, or Firm* — Myers Bigel Sibley & Sajovec, P.A.

(57) ABSTRACT

The present invention relates to a method and apparatus for function testing of a base station system in a wireless communication system, wherein the base station system comprises at least two antennas and at least two transceivers, and said antennas are intended to cover a target area. Function testing of the parts in the base station is based on measurements of performance variations caused by for example bad contact in feeders, misdirected or malfunctioning antennas, malfunctioning feeders, wear and tear of transceivers, and/or corrosion in feeder connections etc. By alternating between TRXs in the base station system for carrying BCCH messages the performance of each TRX is measured at each time period and stored for further analysis. Thereby a decrease or a fault in the base station system is easily detected.

19 Claims, 5 Drawing Sheets

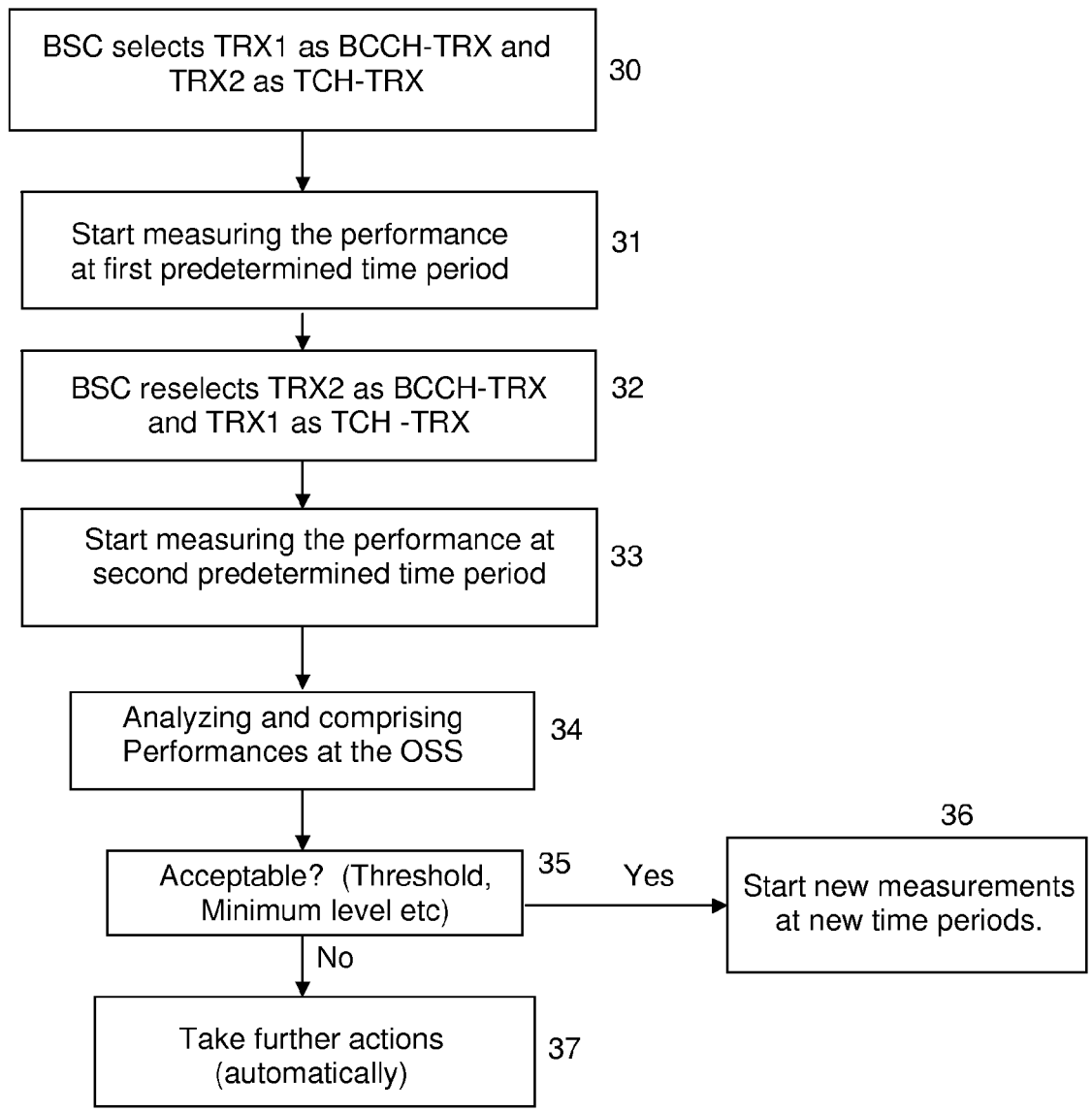
FIG. 2.b

METHOD AND APPARATUS FOR FUNCTIONAL TESTING OF A BASE STATION SYSTEM

TECHNICAL FIELD

The present invention relates generally to wireless communication systems, more particularly, and not by way of limitation, the present invention is directed to an apparatus and to a method in a wireless communication system for function testing of the antennas, feeders and transceivers in the base station system.

BACKGROUND

A typical wireless communication system comprises a plurality of nodes, each performing a specific task. Among other types of nodes in GSM system architecture, the system comprises at least one MSC (Mobile Switching Center) in communication with at least one HLR (Home Location Register), an OSS (Operation Support System) and a plurality of BSS (Base Stations Systems) serving as access points for MS (mobile stations). A BSS comprises a BSC (Base Station Controller) and one or more BTSs (Base Transceiver Stations). The BSC is responsible for the exchange of messages between a MSC (Mobile Switching Center) and a BTS. Traffic and signaling transferred between a MSC and a MS (Mobile Station) will usually pass transparently through a BSC. The BSC, which is a functional entity within GSM architecture, is responsible for RR (Radio Resource) allocation to a MS, frequency administration and handover between BTSs controlled by the BSC. Radio interfaces are terminated at a Base Transceiver Station. Each BTS may comprise: a number of TRXs (Transceivers), typically between 1 and 16; base band processing means; Combiners; radio equipment; and antennas. In GSM systems the BTS is also responsible for ciphering of an air interface.

The MSC is a switching entity of the wireless communications system that is responsible for establishing and controlling communications between subscribers. The HLR is a database found within wireless communication systems, which stores subscriber data relating to services and features in addition to location area based information. The OSS (Operations Support System) is a network management system supporting specific management functions, such as fault, performance, statistical analysis, security, configuration etc.

Unbalance between different parts of an antenna system will degrade cell performance. A cell may have BCCH (Broadcast Control Channel) coverage but not TCH (traffic Channel) or SDCCH (Stand-alone dedicated channel) coverage which will result in TCH and/or SDCCH drops. A broadcast channel is a common channel transmitting to an entire cell area of a base transceiver station, in order to provide cell information for mobile stations located in the cell. In GSM, a broadcast channel includes a FCCH (frequency correction channel), a SCH (synchronization channel) and a BCCH (broadcast control channel). The BCCH channel contains specific parameters needed by a mobile in order that it can identify a network and gain access to it. Typical information included is a LAC (Location Area Code) and a RAC (Routing Area Code), a MNC (Mobile Network Code) and a BA (BCCH Allocation) list. The SDCCH channel is used in GSM systems to provide a reliable connection for signaling and SMS (Short Message Service) messages.

The unbalance mentioned above can be hard to locate as it can be due to wear and tear or malfunctions of any parts (TRX, feeders, antennas etc) within the base station system. A BCCH TRX (transceiver) is transmitting all the time, for example this will cause higher wear and tear on the BCCH TRX compared to other TRXs in a cell. Cellular operators are in need of a simple and fast implementation for regularly monitoring both state and performance of each antenna and BSS transceiver. Radio transmission faults regularly occur and in many cases poor speech quality, poor system access, and poor reliability are due to transceiver malfunctions, broken feeders, malfunctioning and/or wrongly directed antennas not covering a planned coverage areas etc.

The industry has provided various methods for monitoring the state of a BSS, particularly the state of BSS transceivers which are directly responsible for radio communication between a network and mobile subscribers. Periodic transmission of status information of transceivers sent from a BSS to a MSC is one of the most common methods. The MSC forwards the status information data to an Operation Support System (OSS) where it is stored in a database. Then, periodically, this data is manually checked and verified by network administrators. When an error or a problem is detected or suspected in a BSS, technicians are in most cases sent in order to fix the problem. In many cases, the technicians are working for another company and such a problem solving procedure might take a lot of valuable time. In some cases the technicians have performed a wrong installation of feeders or antennas and in some cases it is difficult to detect if the problem is arising from feeders, transceivers or antennas.

SUMMARY

It is an object of the present invention is to provide a simple and more reliable solution for function testing of a base station system.

According to a first aspect of the invention a first TRX is used during a first time period as BCCH transmitter and at least a second TRX is used during at least a second time period as BCCH transmitter, and thereafter alternating between the first TRX and at least the second TRX for BCCH message transmission. By measuring BSS performance at each time period, performance decrease is easy to detect and a decision is taken whether the performance level is acceptable or not.

According to a second aspect of the invention a first TRX is connected to a first antenna during a first time period and at least a second TRX is connected to at least a second antenna during at least a second time period. Both TRXs are used for BCCH message transmission. Measuring performance of a base station system at each time period and analyzing measurement results, faults and performance decrease in the bases station system are easily detected.

According to a third aspect of the invention a first TRX is selected for broadcasting messages during a first time period and at least a second TRX is selected for broadcasting messages during at least a second time period. The TRXs are connected to the same antenna. Measuring performance of the base station system at each time period, faults and performance decrease in the base station system are easily detected.

Preferably the time periods are same times at different days and/or different times during a single day. Differences in measured results are detected by for example STS analysis (Statistics and Traffic Measurement Subsystem) etc.

According to another aspect of the invention, there is provided an apparatus used for functional testing of a base station system in a wireless communication network, the base station system comprising one or more antennas intended to cover a target area and one or more transceiver connected to one or more of the antennas for transmitting and receiving signal information and traffic, the apparatus comprising:

Addition Control Means (ACM) used for alternating BCCH (Broadcast Control CHannel) signaling transmitter between said transmitters, and controlling duration of time periods for the alternating procedure.

An advantage according to one aspect of the invention, by alternating BCCH signal transmitting transceiver in the base station system, antennas, feeders and transceivers are kept worm and dry and therefore corrosion and damage caused by moisture in very wet geographical areas are decreased.

Another advantage according to one aspect of the invention, by alternating BCCH transmitting transceiver wear and tear of antennas and transceivers is evened out and the whole base station system can be served at one occasion and at a much later time.

BRIEF DESCRIPTION OF THE DRAWINGS

For a more complete understanding of the present invention, and the advantages thereof, reference is now made to the following descriptions taken in conjunction with the accompanying drawings, in which:

FIG. 2b is a flowchart explaining the steps performed by the method described in FIG. 2a.

DETAILED DESCRIPTION

It would be useful to have a method for automatically and adaptively detecting antenna and transceiver malfunctions based on performance measurements and thresholds or conditions set by the operator himself. It would be also useful to have a method for centrally investigating parameters to more specifically determine a cause of the malfunction, and when such a potentially malfunctioning part is detected, to confirm the malfunction, and suggest or take an action, such as turning off a particular malfunctioning unit or centrally try to affect a unit to perform better. Such a central action is for example a tilting function which might be implemented in the BSS for determining if a occurring fault depends on misdirected antennas, not covering the planned coverage area (Target cell area) as they should compared to each other.

U.S. Pat. No. 6,104,936 relates to an invention that involves adjusting tilt angles of base station system antennas in a target cell for the purpose of improving the uplink signal quality received by the base station system and for improving the signal quality received by mobile units operating in co-channel cells.

Antenna Hopping is another technique that does to some extent already provide some heat to the antenna system to keep it dry. By applying antenna hopping to a system a portion of the signal is transmitted between the antennas and therefore keeping the antennas active during less busy hours. By keeping the antennas active they are still warm and dry and therefore the antennas and feeders in humid climate will stay in better condition. However, the antenna hopping procedure can not be implemented for functional testing the base station system.

The present invention gives a simple and easy to implement solution for function testing of a base station system at the same time as influencing wear and tear of the antennas.

Figure 1:
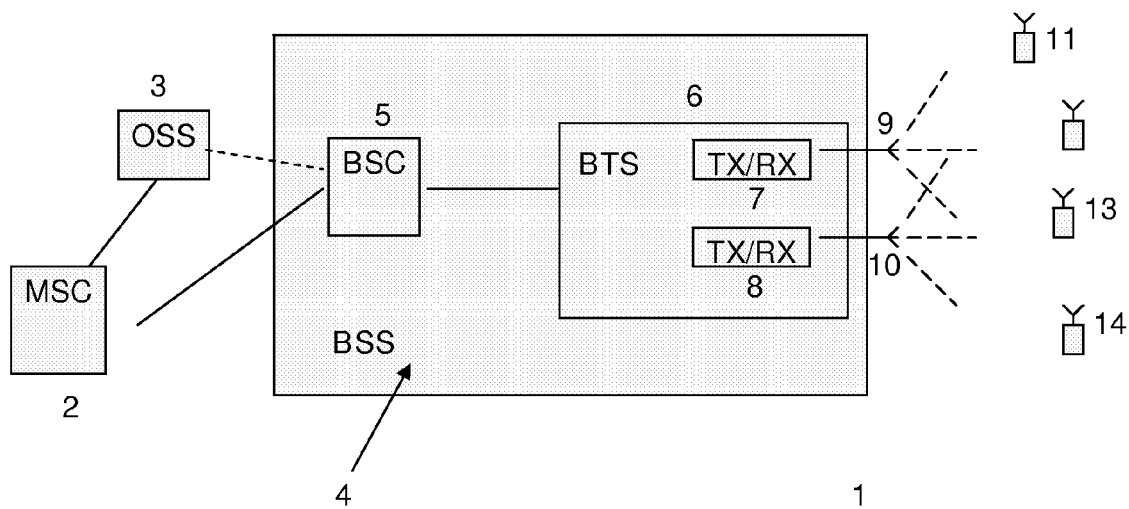
FIG. 1 is a block diagram that schematically illustrates a simple wireless communications system.

Reference is now made to FIG. 1, which describes a prior art wireless communication system 1 for testing and collecting information about transceivers 8 and 9 in a base stations system 4. The system 4 typically comprises a MSC 2, which forwards status information data to an Operation Support System (OSS) 3 to be stored in a database for further analyzing, a BSC 5 responsible for exchange of messages towards the MSC 2 and a BTS 6 which constitutes the access point for one or more mobile stations 11-14. The BTS 6 contains transceivers 7 and 8, feeders and antennas 9 and 10. Each MS sustains communication with a BSS through a radio interface. Quality measurements of an ongoing communication are made over both a downlink and an uplink radio path. Typically, measurements are directed but not limited to a Bit-Error-Rate (BER), a Frame Erasure Rate (FER) and/or signal strength. Other communication parameters are also being computed such as a drop rate of calls, a number or a rate of handoff failures, a number or a rate of call set-up failures and call set-up time. These above mentioned parameters and measurements are used to evaluate a performance status of the transceivers 7 and 8 of the base station system 4. Each transceiver in the base station system calculates its own level of performance using one or more of the mentioned measurements and parameters and compares that level of performance with a predecided acceptable performance level. If this level differs over a value or does not satisfies a minimum acceptable level an operator is notified. The MSC 2 or the BSC 5 forwards measurement results to the OSS 3, wherein the OSS 3 stores the results in an OSS database. The OSS 3 might be directly connected to the BSC 5 (dashed line in the figure), this way BSC 5 statistics (handovers/handoffs, drops, call setups etc) are sent directly to the OSS 3.

Downlink information is typically carried by Broadcast Channels. Such a channel is a Frequency Correction Channel (FCCH), a Synchronization Channel (SCH) or a Broadcast Control Channel (BCCH). The FCCH and the SCH transmit information needed for mobiles to stay synchronized with a cell. The BCCH includes general information about a BTS. When a mobile station is switched on and not engaged in communications with the BTS (idle mode), it listens to the BCCH channel. The BCCH is a channel where system information messages are being sent to all idle mobile stations within the cell. These system information messages describe the cell for mobile stations in terms of how information sent in the cell is organized and how the mobile stations should behave in the cell.

Figure 2:
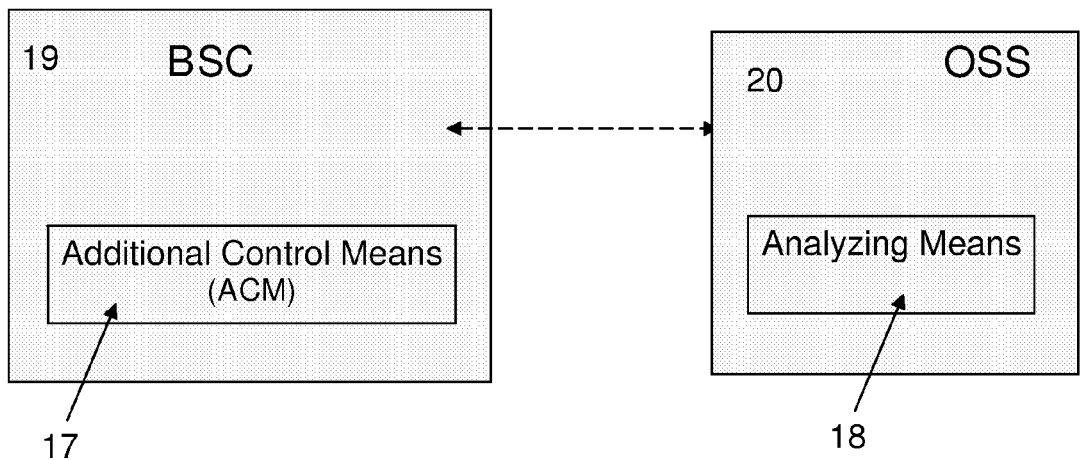
FIG. 2 is a block diagram that shows an embodiment of the present invention.

In FIG. 2, a BSC 19 (Base Station Controller) and an OSS 20 (Operation Support System) implementation in accordance with an embodiment of the present invention are described. The BSC 19 includes an ACM 17 (Additional Control Means) used mainly for selecting a first TRX (Transceiver) in a BTS, as a BCCH-TRX, and thereafter alternating between transceivers in the BTS to be used as BCCH-TRX. Other functions that might be initiated by the Additional Control Means 17 are for example measuring performances at time periods, collecting and forwarding measured performance information to the OSS 20, antenna tilting and rotating, control functions etc. The OSS, in FIG. 2, includes AM 18 (Analyzing Means) used mainly for receiving, storing and analyzing measured information sent from the BSC, via the MSC, to the OSS. Notice that the ACM is not limited to be a part of the BSC, but could be placed in the OSS, BTS, and MSC or distributed in the BSS.

Figure 2A:
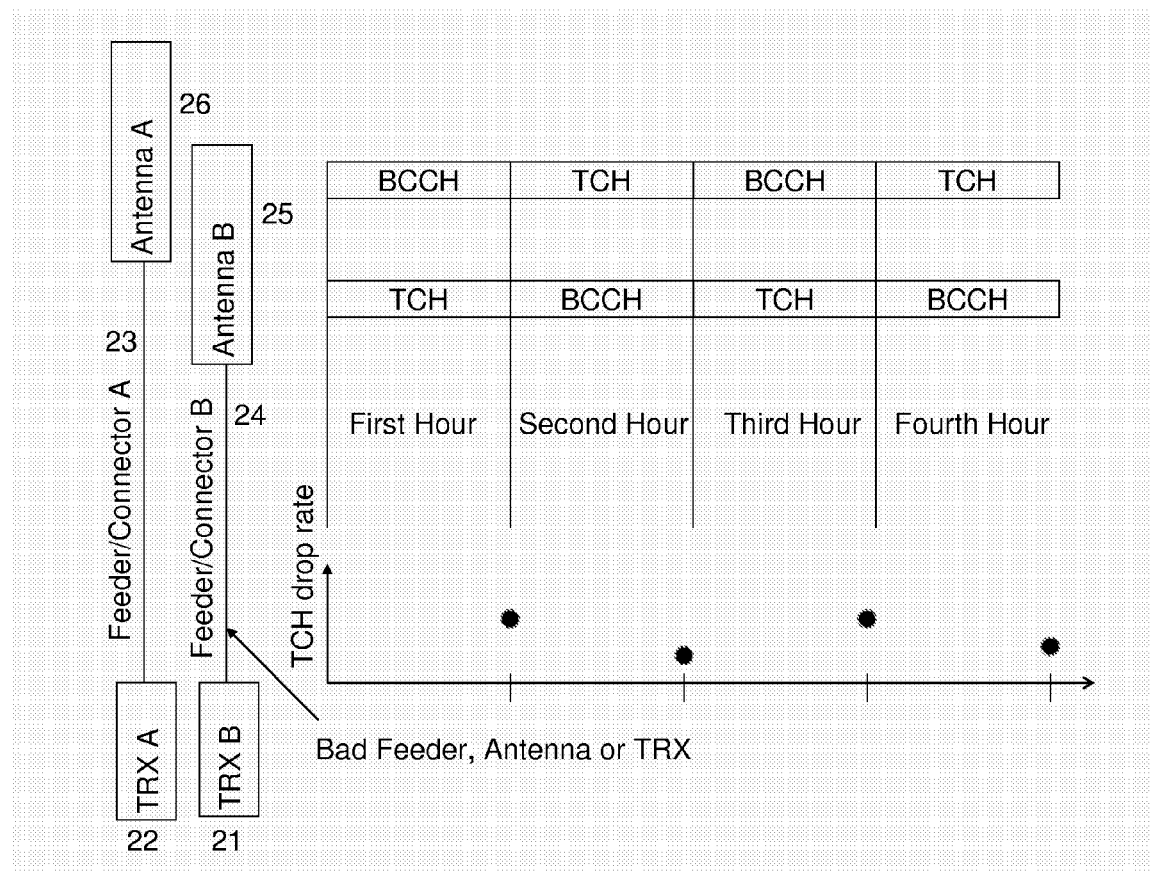
FIG. 2a is a block and signal diagram illustrating another embodiment of the present invention for function testing of a base station system comprising two antennas, wherein each antenna is connected to only one transceiver.

Reference is now made to FIG. 2a, which describes a function testing implementation according to an embodiment of the present invention for detecting malfunctions in a base station system. In this embodiment, the base station system includes only two transceivers each connected to an antenna via a feeder. According to the figure, two TRXs 21-22 belonging to a cell, with a feeder 23-24, transceiver 21-22 or antenna 25-26 problem, makes a TCH (Transmission Channel) weaker than a BCCH every second measurement period when alternating BCCH message transceiver periodically. This will result in a higher drop rate indication at the end of every second measurement period. Consider a base station system comprising a 2-TRX 21-22 2-antenna 25-26 site and there is no alternating function. If there is a bad connection in one of the feeders, malfunctioning or misdirected antennas or malfunctioning transceivers in the considered base station system, then some calls will experience an either weaker BCCH, compared to the TCH transmitted on the other TRX for the same time period, or a stronger BCCH depending on which feeder or transceiver is malfunctioning. If the BCCH is strong, an incoming mobile roaming into the cell will measure strong BCCH signal and thereafter connect to a bad TCH causing a drop of a call attempt. This results in that a counter counting TCH drops adds another dropped TCH to a stored number. When the speech carrier (TCH) is weak or interfered a periodically (on the same timeslot) sent SACCH message which includes measurement data will not be possible to be decoded or read by the MS or the BSC and therefore the SACCH message will be considered lost. Too many lost SACCH messages will eventually result in a dropped call as an algorithm for this procedure considers a starting value of a counter for the maximum in a row allowed SACCH message losses, and then decrease this counter by e.g. one for each lost SACCH message. If the starting value is 16 then 16 consecutive lost SACCH messages are allowed before a drop of a call with a decrease of one for each lost SACCH message If the TRX, in the above mentioned case, is changed periodically the problem with dropping the calls will be decreased or completely avoided. A difference between coverage areas and numbers of drop calls will give information of which coverage area is causing most drops. This difference of area coverage is based on bad feeders or malfunctioning transceivers. With the aid of statistical analyses, it is easy to detect differences of performance and thereafter which feeder or transceiver is causing them. The statistical analysis is based on for example:
  analyses of drop rates.
  successful handoff back to old channel within a predefined time.
  absolute number of SACCH or TCH drops
  path loss difference (not in STS though but another OSS tool such as the MRR might be used to compare uplink path loss to downlink path loss for each instant in time).
  traffic load.
  denied access.
  handoff lost.

Most prominent differences are measured exactly when the base station system alternate BCCH and TCH transmitting transceiver between the transceivers 21-22 in the bases station system. The most advantage measurements are performed at the same time in the beginning and at the end of each measurement period.

Reference is now made to FIG. 2b, a flowchart relating to an embodiment of the present invention according to FIG. 2a. In a first step 30, the BSC 19 selects TRX1 21 to be a BCCH-TRX and TRX2 22 to be a TCH-TRX. In next step 31, the BSC collects measurement data relating to transceivers performance during a first predetermined time period, preferably chosen to have a duration of an hour. In next step 32, the BSC alternate to TRX2 22 as the BCCH-TRX and TRX1 21 as the TCH-TRX, for a predetermined second time period, preferably the hour after the first predetermined time period and/or the same hour as the first predetermined time period but on another day. In a following step 33, the BSC collects measurement data relating to the transceivers performance during the second predetermined time period. This measurement data is sent to the OSS 20, via the MSC 2, to be stored in a database. In the following step 34, the OSS receives the measurement data from both measurements and analysis it for example by using STS (Statistics and Traffic measurement Subsystem). STS creates a general statistic data collection and processing system for traffic handling and maintenance applications. The OSS 20 might also compare the measurement data from both measurements with earlier measurement results to detect performance decrease or variation in the BSS. Then the OSS, in step 35, evaluates the performance differences for example based on:
  pre-stored values set by the operator and depending on the times the performance measurements were made.
  threshold values.
  performance variations between transceivers.
  percentage degradation in relation to earlier measured performances.
  reached minimum performance level.

The last case mentioned above is not fulfilled for example when a feeder or a transceiver is malfunctioning, broken or wrongly installed, which is unfortunately a common problem. Then, a decision is taken if a performance level of a transceiver and/or antenna is acceptable or not. In case when the performance level is acceptable, step 36, the measurements are stopped or started again, as in step 30, at new time periods decided by for example an operator or an administrator. In cases when the performance level is not acceptable, step 37, further action must be taken. A further action might be one or more of the following steps:
  automatically/manually sending an alarm signal to the administrator or operator.
  Automatically/manually tilting the antenna vertically to compensate for a misdirected antenna.
  Automatically/manually rotating the antenna horizontally to compensate for a misdirected antenna.
  Automatically/manually turning off a TRX in time for reparation.
  Automatically/manually sending an order to a service department etc.

Note that the invention is not in any way limited to the actions or analyzing procedures mentioned above. Also, the invention is not in any way limited to a system comprising only two antennas and two transceivers in such a way as described by FIGS. 2a and 2b. On the contrary the invention is even more suitable for a base station system comprising more than two antennas and two or more base transceiver stations, where each antenna is connected to one or more transceiver, preferably at least two transceivers combined by the aid of a combiner.

Figure 3:
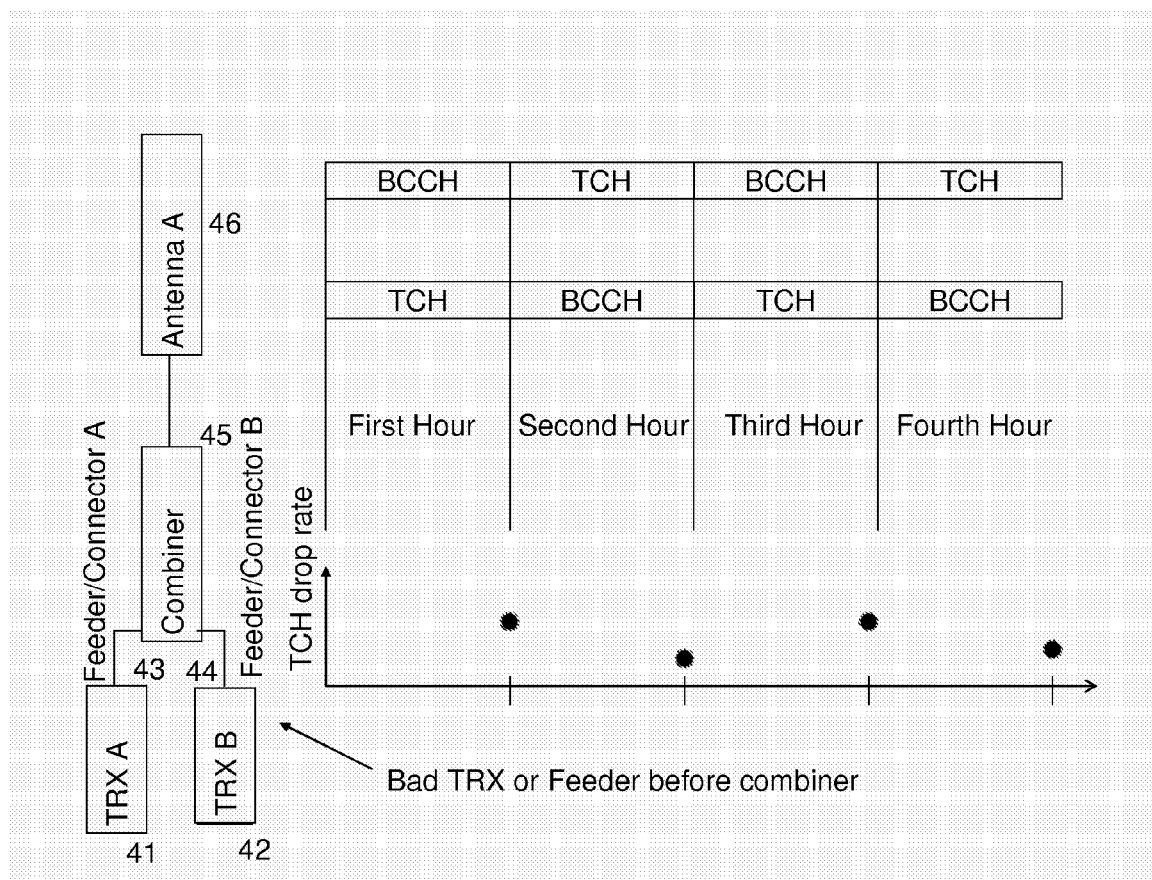
FIG. 3 is a block diagram that illustrates a base station system function testing method in a two-transceiver one-antenna site, wherein both transceivers are connected to only one antenna via a feeder and a combiner.

Reference is now made to FIG. 3, which describes yet another embodiment according to the present invention for function testing of a base station system. In this embodiment a part (preferably one of the two similar parts of a BTS) of the base station system is described. The part comprising two transceivers 41 and 42 connected to a same antenna via a combiner 45 and two feeders 43-44. According to the figure, two TRXs 41-42 belong to a cell and are connected to one and the same antenna 46. A transceiver (41, 42) problem or a feeder (43, 44) problem (before the combiner 45) makes a TCH (Transmission Channel) weaker than a BCCH every second measurement period when alternating BCCH message transceiver periodically. This will result in a higher drop rate indication at each end of every second measurement period. If there is a bad connection in one of the feeders or a malfunctioning transceiver in the part of the base station system comprising a 2-TRX 1-antenna site and there is no alternating function, then the same will happen as in the case described by FIG. 2a. Some calls will experience an either weaker BCCH, compared to the TCH transmitted on the other TRX for the same time period, or a stronger BCCH depending on which feeder or transceiver is malfunctioning. Notice that in a BTS there are at least two such parts as mentioned above, which also might be used to evaluate antenna performances when analyzed and compared with each other. A BSS might include several such parts in one or more BTSs.

Antenna combiners are adopted to use same antenna for several TRXs (carriers), the more TRXs are combined the greater the combiner loss will be.

Typically a BTS, for anything other than a picocel will have several transceivers (TRXs) which allow it to serve several different frequencies or even several cells (in the case of sectorized base station system).

In some cases the BTS is a plain transceiver which receives information from the MS and converts the information in accordance with a PCM based interface, the Abis (interface between the BTS and the BSC), and sends the information towards the BSC. There are other cases where the BTSs are built so that information is preprocessed, target cell lists are generated and even intra cell HO (Hand Over) can be fully handled, and advantage in this case is low load on the expensive Abis interface.

Also typically, the Base Station Controller (BSC) provides the intelligence behind the BTSs and in many cases a single BSC has 10 s or even 100 s of BTSs under its control.

Figure 4:
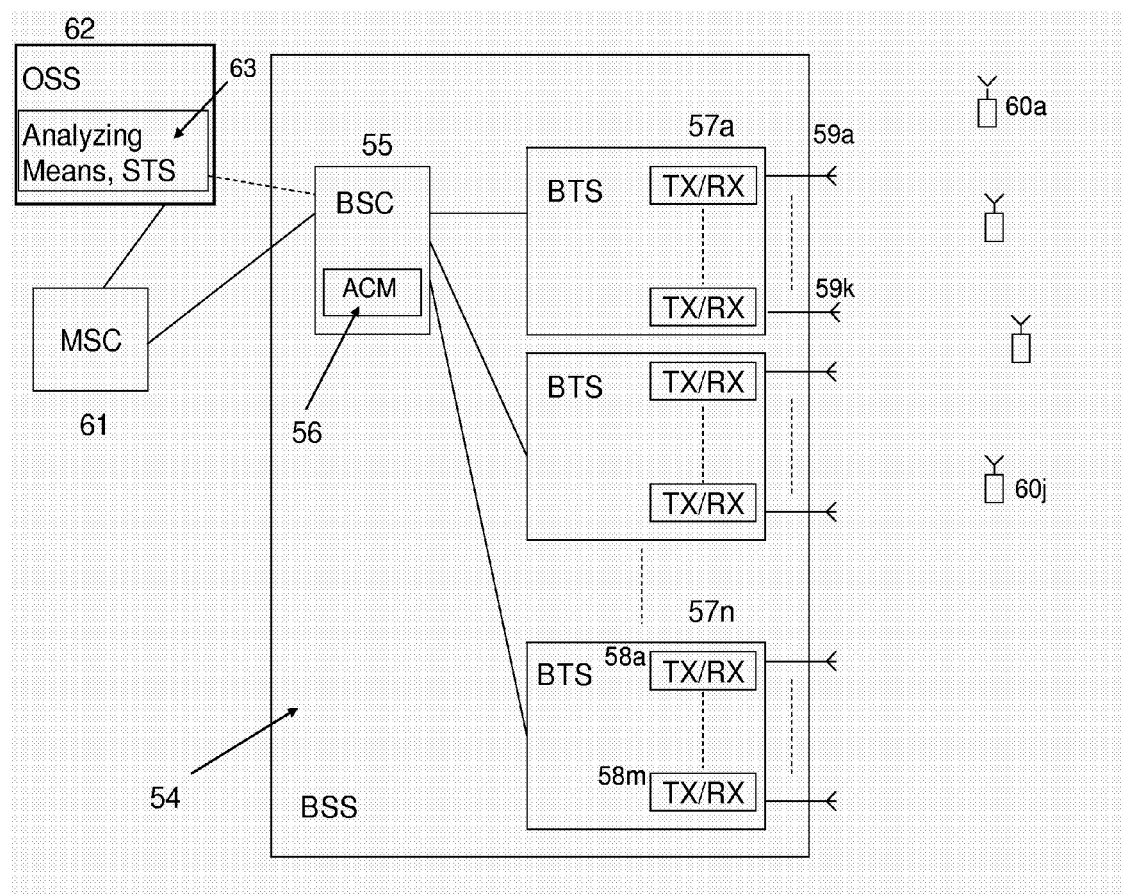
FIG. 4 is a block diagram that shows another embodiment of the present invention for function testing of a base station system comprising several antennas each in connection with at least two transceivers combined with the aid of at least one combiner.

Reference is now made to FIG. 4, which describes anther embodiment of the present invention in a more developed base station system. According to the figure, a base station system (BSS) 54 might include one or more base station controllers (BSCs) (one in this example), each BSC 55 controlling several BTSs 57a-57n and each BSC 55 including Additional Control Means 56 (ACM) for alternating between BCCH transmitting transceivers 58a-58m. The transceivers are further connected to antennas 59a-59k which typically belongs to a single BTS. One or more transceivers might be connected to a single antenna by the aid of combiners (not shown in this figure). Each BSC reports performance measurement information to an OSS 62, via an MSC 61, for storing them in an internal database in purpose of further analyzing. The OSS 62 includes Analyzing means 63 for performing operations such as:
  STS analyzes (statistical analyzing method).
  comparing performance measurements to earlier measurement results.
  comparing the differences of performances to predecided values stored in an OSS database.
  Threshold activated alarms.
  comparing measurement results to a predetermined minimum performance value etc.

In such a base station system malfunction testing and malfunction locating procedures might in many cases result in time requiring and expensive procedures. By the solution described in the present invention malfunctioning parts in the base station system are more easily to detect and to locate. Malfunctioning antennas are detected when an antenna intended to cover a planned coverage area not reaches an acceptable performance level or does not fulfill demands requested by the operator, when analyzed by the analyzing means 63. Some of the problems with a malfunctioning antenna might be solved by tilting or rotating an antenna to compensate for faults caused by misdirection, which means that an antenna is directed in a way not covering the planned coverage area it is intended to cover. By alternating BCCH transmitting transceiver among transceivers connected to the same antenna, performance of each transceiver can be measured and transceiver/feeder problems can be detected. By alternating BCCH transmitting transceivers among transceivers connected to different antennas both transceiver performances and antenna performances can be measured. Measured information is stored and analyzed in the OSS 62 by the Analyzing means 63. This way each transceiver, feeder and/or antenna in the base station system can be tested.

In another embodiment according to the present invention, the Analyzing means is not bound to be included in the OSS 62 but might be located in the BSC 55, centrally in a wireless communication system or as a separate apparatus in a BSS. The number of transceivers connected to the same antenna differs from a base station system to another. Thresholds, minimum values and predetermined time periods are dynamically adjustable and preferably set by an operator or by an administrator of a base station system.

By the solution presented by the present invention not just base station system parts are tested for malfunction detections, but also wear and tear of parts in the base station system is reduced and corrosion on antennas, feeders and transceivers is decreased by keeping them dry in humid climate, which in turn is considered as an existing big problem. All this is achieved by a simple and cost inexpensive procedure based on alternating BCCH-TRX among transceivers in a BTS in a BS system. Notice that the solution is not limited to comparing parts in just a single BTS with each other but is also possible for comparing parts of a BTS with parts of other BTSs in a base station system.

In the drawings and described in the foregoing Detailed Description, there have been disclosed typical preferred embodiments of the invention and, although specific terms are employed, they are used in a generic and descriptive sense only and not for purposes of limitation, the scope of the invention being set forth in the following claims.

The invention claimed is:

1. A method for function testing of a base station system for a wireless communication system, where the base station system comprises at least two antennas and at least two transceivers, and the antennas are intended to cover the same coverage area, said method comprising:
  selecting a first transceiver in the base station system to send broadcast messages and not traffic channel messages during a first time period;
  selecting a second transceiver in the base station system to send traffic channel messages and not broadcast messages during the first time period;
  selecting the second transceiver in the base station system to send broadcast messages and not traffic channel messages during a second time period, wherein the first and second time periods alternately repeat in time;

selecting the first transceiver in the base station system to send traffic channel messages and not broadcast messages during the second time period; and measuring performance of the base station system using the sent messages at each of the first and second time periods to determine if there is at least one unacceptable malfunction in the base station system.

2. A method according to claim 1, wherein the measuring performance of the base station system comprises:
   measuring performance of a first antenna, connected to the first transceiver, during the first time period;
   measuring a performance of at least a second antenna, connected to the second transceiver, during the second time period; and
   comparing the antenna performance of said first antenna and at least the second antenna to determine if there is at least one unacceptable malfunction in the base station system.

3. A method according to claim 1, where the measuring performance of the base station system comprises measuring performance of an antenna connected to both the first transceiver and the second transceiver through a combiner during the first and second time periods, and comparing the measured performance of the antenna during the first and second time periods to determine if there is at least one malfunctioning transceiver and/or feeder in the base station system.

4. A method according to claim 1, wherein the measuring performance of the base station system comprises:
   comparing the measured performance result with stored results and a difference threshold value;
   performing Statistics and Traffic Measurement Subsystem (STS) analysis on the measured performance result; and/or
   comparing each measured performance result to at least a predetermined least acceptable performance threshold value.

5. A method according to claim 1, further comprising taking action in response to determining that there exists at least one malfunctioning part of the base station system.

6. A method according to claim 5 where the taking action comprises:
   automatically turning off a transceiver or an antenna;
   tilting an antenna vertically;
   rotating an antenna horizontally;
   sending alarm signals to an operator; and/or
   informing a network administrator and suggesting an action to be taken.

7. A method according to claim 1, wherein the measuring performance of the base station system comprises measuring:
   A Bit-Error-Rate (BER);
   A Frame Erasure Rate (FER);
   Signal strength;
   Drop rates;
   Rate of handoff failures;
   Rate of call set-up failures;
   An absolute number of slow associated control channel (SACCH) or transmission Channel (TCH) drops; and/or
   Call set-up times.

8. A method according to claim 1, wherein the broadcast messages comprise broadcast control channel messages, frequency correction channel messages, and/or synchronization channel messages.

9. A method according to claim 1, wherein the selecting the first transceiver and the selecting the second transceiver are controlled to decrease wear and tear on the first and second transceivers, feeders connections between the first and second transceivers and antennas, and/or the antennas in the base station system, and/or to increase protection against corrosion of parts in the base station system.

10. An apparatus in a wireless communication network configured to perform functional testing of a base station system (BSS), where the base station system comprises one or more base station controllers (BSCs) and one or more base station transceivers (BTSs), said each BTS comprising at least two antennas intended to cover a planned coverage area and at least two transceivers connected to one or more of the antennas for transmitting and receiving broadcast messages and traffic channel messages, the apparatus comprising Additional Control Means (ACM) circuitry configured to perform functional testing of parts in the base station system by:
   selecting a first transceiver in the base station system to send broadcast messages and not traffic channel messages during a first time period;
   selecting a second transceiver in the base station system to send traffic channel messages and not broadcast messages during the first time period;
   selecting the second transceiver in the base station system to send broadcast messages and not traffic channel messages during a second time period, wherein the first and second time periods alternately repeat in time;
   selecting the first transceiver in the base station system to send traffic channel messages and not broadcast messages during the second time period; and
   measuring performance of the base station system using the sent messages at each of the first and second time periods to determine if there is at least one unacceptable malfunction in the base station system.

11. An apparatus according to claim 10, wherein the Additional Control Means circuit if further configured to:
   measure a performance of a first antenna, connected by the first transceiver, during the first time period;
   measure a performance of at least a second antenna, connected the second transceiver, during the second time period; and
   forward measured information to an analyzing circuit for determining if there are unacceptable malfunctions of parts in the base station system.

12. An apparatus according to claim 10, wherein the Additional Control Means circuit is further configured to measure a performance of an antenna in the base station system connected to both the first transceiver and the second transceiver through a combiner during the first and second time periods, and configured to compare the measured performance of the antenna during the first and second time periods to determine if there are unacceptable malfunctions of parts in the base station system.

13. An apparatus according to claim 10 wherein, when measuring performance of the base station system at each of the first and second time periods to determine if there is at least one unacceptable malfunction in the base station system, the Additional Control Means circuit is further configured to perform:
   comparing a measurement the measured performance result with stored results and a difference threshold value;
   performing Statistics and Traffic Measurement Subsystem (STS) analysis on the measured performance result; and/or
   comparing each measured performance result to at least a predetermined least acceptable performance threshold value.

14. An apparatus according to claim 10, wherein the apparatus further comprises circuitry configured for taking action when in response to determining that there exists at least one malfunctioning part in the base station system.

15. An apparatus according to claim 10 where the circuitry configured for taking action is configured to:
control turning off a transceiver or an antenna;
control tilting an antenna vertically;
control rotating an antenna horizontally;
control sending of an alarm signal to an operator; and/or
control informing a network administrator and suggesting an action to be taken.

16. An apparatus according to claim 10 where the measured performance relates to:
A Bit-Error-Rate (BER);
A Frame Erasure Rate (FER);
Signal strength;
Drop rates;
Rate of handoff failures;
Rate of call set-up failures;
An absolute number of slow associated control channel (SACCH) or transmission channel (TCH) drops; and/or
Call set-up times.

17. An apparatus according to claim 10, wherein the broadcast messages comprise broadcast control channel messages, frequency correction channel messages, and/or synchronization channel messages.

18. An apparatus according to claim 10, wherein the Additional Control Means is further configured to control selection of the first transceiver and the second transceiver to decrease wear and tear of parts in the base station system, and/or to increase protection against corrosion of parts in the base station system.

19. A Base Station Controller, BSC, in the base station system for the wireless communication network, where the BSC comprises the apparatus according to claim 10.

* * * * *